(No Model.)
A. JILLSON.
HUB FOR TRACTION WHEELS.
No. 278,021. Patented May 22, 1883.
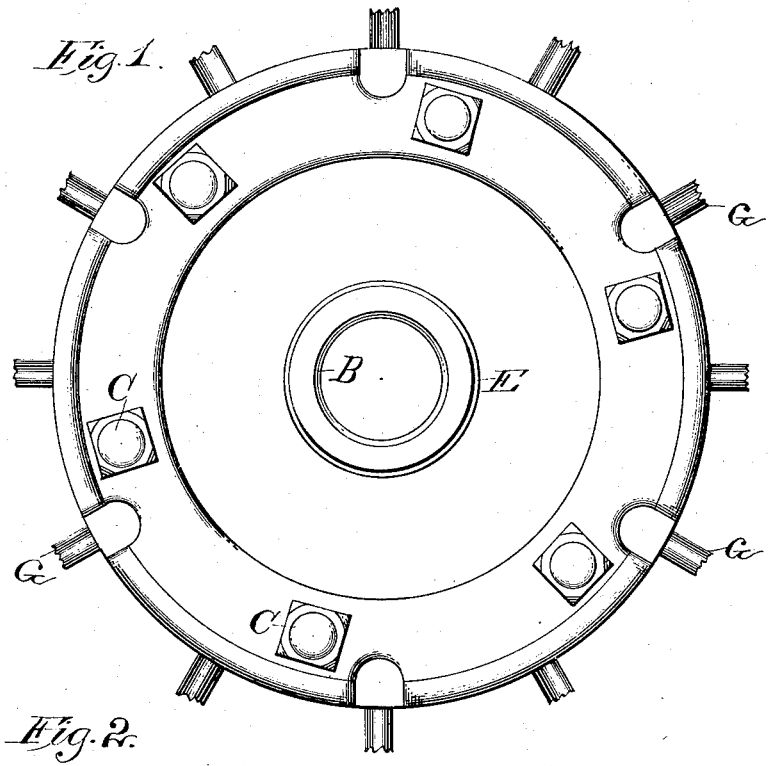
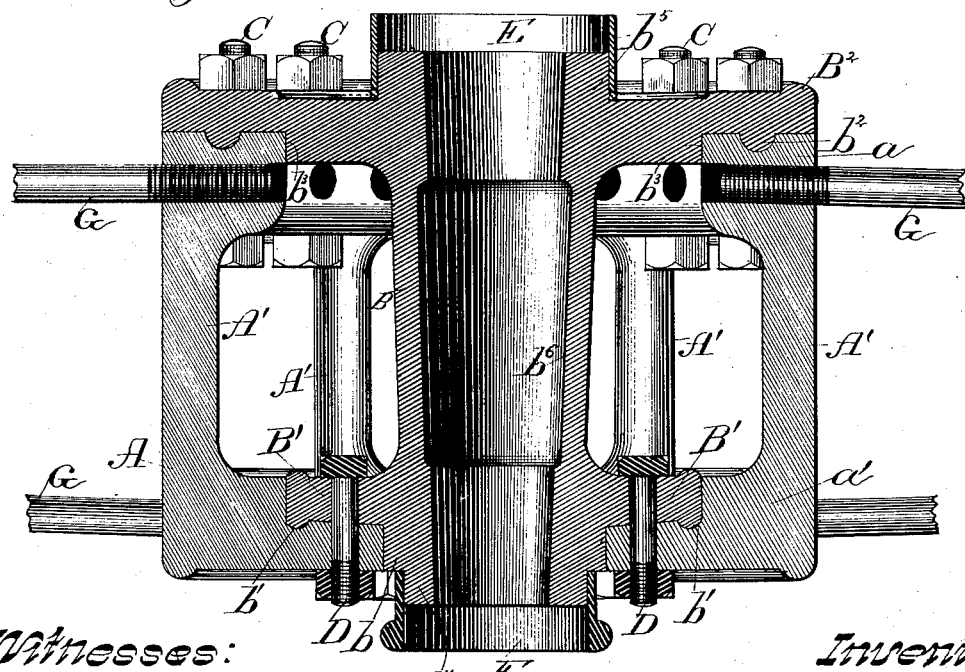
Witnesses:
E. G. Asmus
Adolph Klein
Inventor:
Alonzo Jillson
By
Stout & Underwood
Attorneys.

UNITED STATES PATENT OFFICE.

ALONZO JILLSON, OF RACINE, WISCONSIN.

HUB FOR TRACTION-WHEELS.

SPECIFICATION forming part of Letters Patent No. 278,021, dated May 22, 1883.

Application filed March 13, 1883. (No model.)

*To all whom it may concern:*

Be it known that I, ALONZO JILLSON, of Racine, in the county of Racine, and in the State of Wisconsin, have invented certain new and useful Improvements in Hubs for Traction and other Wheels; and I do hereby declare that the following is a full, clear, and exact description thereof.

My invention relates to hubs especially designed for traction and other heavy wheels, and will be more fully set forth hereinafter.

In the drawings, Figure 1 is an elevation of the inner end of my device, and Fig. 2 is a longitudinal section of the same.

A is the hub proper, and B is a removable flanged box fitting within the said hub. The hub and box are very irregular in their interior formation, as shown in Fig. 2, but are adapted to each other, so that when put together and bolted they will remain united, without danger of accidental separation from strain, and present a smooth and regular external appearance. The said box B has the exterior circular flange, $B^2$, extending from near its inner end, and having a periphery even with the outer periphery of the hub A, and the interior circular flange, B', of much less diameter, near the outer end of said box. The flange $B^2$ is provided with the shoulder or offset $b^3$ and the bead $b^2$, while the flange B' has the bead $b'$ and the offset $b$. The beads in the said flanges fit into corresponding depressions in the disks $a$ and $a'$ of hub A, whose interior surfaces fit against the described offsets, thereby serving, when the box has been pushed within the hub, as a guard against strain, as stated.

C C are the bolts which secure the flange $B^2$ and inner disk, $a$, of the hub together, and D D are the bolts which perform a like office with respect to the outer disk, $a'$, of the hub and the flange B' of the box. The interior of the box is conically bored out to receive an axle or skein, and the center of this bore is made deeper, as shown at $b^6$, for the purpose of containing lubricating material. The inner end of the box has another offset, $b^5$, to receive a sand-band, E, and the outer end has still another offset, $b^4$, for the outer sand-band, F.

The hub A, as shown, consists, primarily, of the disks $a$ and $a'$, and these disks are connected together by the bars A' A', the whole being rigidly cast in one piece, and the central opening in the disk $a$ is large enough, as shown, to permit the flange B' of the box to pass through when the parts are being put together, and the said disks $a$ and $a'$ are provided with perforations to admit the spokes G of the wheel.

All the parts of my device are formed of metal, and the whole forms a most solid and satisfactory hub for the heavy traction or other wheels for which it is adapted, besides which, should the box become broken, it can be removed by simply unscrewing the bolts C and D and replaced by another, leaving the hub proper intact.

Having thus described my invention, what I claim as new, and desire to secure by Letters Patent, is—

1. In a hub for traction and other heavy wheels, the combination of the disks $a$ and $a'$, united integrally by the bars A' A', with the removable metallic box B, having the flanges B' $B^2$, of different diameters, substantially as set forth.

2. The combination of the hub A, having disks $a$ and $a'$, united integrally by the bars A' A', the disk $a$ having a central opening of greater diameter than that in the disk $a'$, with the metallic box B, having the flanges B' $B^2$, adapted to fit within and against the said hub, and the securing-bolts C D, substantially as set forth.

In testimony that I claim the foregoing I have hereunto set my hand on this 13th day of February, 1883, in the presence of two witnesses.

ALONZO JILLSON.

Witnesses:
STANLEY S. STOUT,
ADOLPH KLEIN.